United States Patent Office 2,916,385
Patented Dec. 8, 1959

2,916,385

COLORING COMPOSITION AND METHOD OF PRODUCING THE SAME

Jacob Christopher Bauernfeind and Raymond Howard Bunnell, Pompton Plains, N.J., assignors to Hoffmann-La Roche Inc., Nutley, N.J., a corporation of New Jersey No Drawing. Application October 8, 1957
Serial No. 688,821

20 Claims. (Cl. 99—148)

This invention relates to a coloring composition useful especially for coloring foodstuff. In particular, the invention pertains to a stable carotene composition which is especially adapted for the coloring of butter.

The natural color of butter varies considerably depending upon the breed of cow from which the milk is obtained and due to seasonal variations in the type of feed consumed by the dairy animals. It is a widespread practice in the dairy industry to add coloring matter to the butter during a good part of the year in order to consistently produce a product of uniform color.

$\beta$-Carotene is a naturally occurring coloring agent which also has vitamin A activity. Because it occurs naturally and has vitamin activity, $\beta$-carotene is highly desirable for use in foods to which colors are added and is preferable to artificial coloring agents such as coal tar dyes. The very limited solubility of $\beta$-carotene in common solvents under normal conditions restricts its use and adaptability, however. The use of $\beta$-carotene for coloring butter in particular presents a difficult problem since much of the butter is produced by the batch method. The batch method is carried out at low temperatures which imposes additional limitations on the ability to use carotene compositions. In addition, the presence of two phases, an aqueous phase, buttermilk, and a fatty phase, milk fat, during churning adds further to the problem.

A stable $\beta$-carotene composition useful for coloring butter and which may be readily incorporated at any stage of the process has now been found. The composition is especially useful when the batch method is utilized and is also convenient to produce, store, transport and use. The carotene composition may, of course, be utilized for coloring foodstuffs other than butter, although it is particularly useful for the latter product.

According to our invention, finely divided carotene is suspended at an elevated temperature in an edible vegetable oil containing a minor proportion of an edible, saturated aliphatic higher fatty acid having 16 to 22 carbon atoms. When the carotene fatty acid-vegetable oil mixture cools, a semi-solid gel forms. The composition retains the semi-solid form until it is stirred or agitated. When the gel is stirred or agitated vigorously, even at room temperature or somewhat below room temperature, the gel structure is broken and the material becomes a free flowing, viscous liquid which may be readily poured. The semi-solid gel forms again when the liquid mixture is again heated and permitted to cool. The process of stirring to break up the gel and heating to reset the gel may be repeated.

Coloring compositions for foodstuffs in general containing about 1.0% to about 30% by weight of $\beta$-carotene in stable suspension may thus be produced. The $\beta$-carotene is also protected against loss of potency in this form.

The $\beta$-carotene compositions of this invention, in addition to the stability, provide a high degree of flexibility in preparation and use. The compositions may be poured into metallic or plastic containers and sealed immediately after production then permitted to set in the sealed container upon cooling. The carotene concentration and the package size may be varied over a broad range so as to be adapted to various uses. For example, concentrates containing sufficient $\beta$-carotene in single or multiple units for standard size commercial batches of butter may be made up. Alternatively, small units may be sealed in flexible metallic or plastic bags. Upon kneading the bag, the gel structure is broken and when the package is opened, the contents are poured out in liquid form. One or more units may be utilized depending upon the coloring requirements.

The free flowing $\beta$-carotene composition may be readily incorporated into butter at any stage of the process, i.e. to the cream before pasteurization, to the cream in the churn, to the butter after the buttermilk has been removed or to the butter when the salt is added. The liquid carotene in vegetable oil composition is readily dispersed and provides a uniform color.

The $\beta$-carotene compositions may be produced by suspending dry micropulverized $\beta$-carotene in a heated solution of vegetable oil which contains the higher fatty acid. According to this modification, it is preferable to first dissolve the higher fatty acid in the edible vegetable oil while maintaining an elevated temperature, e.g. 65 to 75° C. The solution is then cooled to about 45 to 50° C. and the micropulverized $\beta$-carotene is thoroughly admixed.

Alternatively, a $\beta$-carotene-oil concentrate such as the commercially available 24% suspension of micropulverized carotene in vegetable oil may be used instead of the dry crystalline substance. The suspension is also added at a temperature of about 45 to 50° C. The 24% suspension is a particularly convenient source of carotene.

After the $\beta$-carotene has been thoroughly admixed at the elevated temperature with the vegetable oil and higher fatty acid, according to either of the methods described above, the mixture is permitted to cool, e.g. to a temperature below about 30° C., so that it sets in the semi-solid gel form. It is convenient to pour the warm mixture in the container into which it will be sold, seal the container and allow the mixture to gel therein.

By the methods described above, coloring compositions containing about 1.0 to about 30.0% by weight of $\beta$-carotene may be produced for direct use in coloring foodstuffs or as a concentrate to be further diluted before being added to food. Preferably a 1 to 10% carotene composition is used for coloring butter directly.

The fatty acids which impart the reversible gel structure to the vegetable oil are edible, aliphatic higher fatty acids having 16 to 22 carbon atoms in the molecule, for example, stearic, palmitic, behenic acids, etc. Stearic and palmitic acids are preferred. The fatty acid is dissolved in the heated oil in an amount of about 2.0 to about 15% by weight of final composition. Preferably about 5 to 10% by weight of stearic acid is utilized.

The vegetable oil, which comprises the major proportion of the composition, is an edible vegetable oil which is liquid at butter churning temperature, e.g. about 10° C. and above. This includes, for example, corn oil, peanut oil, cottonseed oil, fractionated coconut oil, soybean oil, sesame oil, etc. Corn oil and peanut oil are preferred.

About 10 to 50 milligrams of a 7% $\beta$-carotene gel composition is sufficient to color one pound of butter.

A particularly preferred composition comprises refined corn oil as the edible vegetable oil and stearic acid as the fatty acid. This composition contains preferably about 7.5% stearic acid and about 7% $\beta$-carotene, the remainder being the vegetable oil, all by weight of final composition. Another preferred composition comprises refined peanut oil as the edible vegetable oil and palmitic acid as the fatty acid.

When other vitamins such as vitamins A or D are to be incorporated in the food composition along with carotene, these vitamins may be included in the gel composition without departing from the spirit of this invention.

The following examples are illustrative of the invention.

*Example 1*

5.0 g. of stearic acid where dissolved in 89.7 g. of refined corn oil maintained at a temperature of 65 to 75° C. The solution was cooled to 45 to 50° C. 5.3 g. of a commercially available 24% suspension of β-carotene in coconut oil were added and the mixture was thoroughly stirred. While still warm, the mixture was canned according to conventional practice.

The cans were later opened and the hardened gel was stirred until the composition became liquid. The liquid composition was added to chilled cream in a proportion of 0.1 g. of gel per cup of cream. The mixture was churned to butter in the conventional manner. The finished butter was uniformly golden in color.

*Example 2*

10 g. of palmitic acid were dissolved in 65 g. of peanut oil and to the solution were added 25 g. of a 24% suspension of carotene in oil according to the procedure described in Example 1. The warm mixture was packaged and cooled.

*Example 3*

7.5 g. of stearic acid were dissolved in 77.9 g. of corn oil and to the solution were added 14.6 g. of a 24% suspension of β-carotene in oil according to the procedure described in Example 1. The warm mixture was canned.

The canned mixture was stirred to produce a free flowing liquid and used in the production of butter as described in Example 1. A uniformly golden colored butter was produced.

*Example 4*

10.0 g. of stearic acid were dissolved in 75.4 g. of corn oil and to this solution were added 14.6 g. of a 24% suspension of carotene in oil according to the procedure described in Example 1. The mixture was packaged and then used in the production of golden butter also as described in Example 1.

*Example 5*

Dry micropulverized β-carotene was suspended in corn oil to produce a 34.3% carotene suspension.

5.0 g. of stearic acid were dissolved in 77.5 g. of corn oil maintained at a temperature of 65 to 70° C. The solution was then cooled to about 55° C. 17.5 g. of the β-carotene-corn oil concentrate was thoroughly admixed with the stearic acid-corn oil solution. The liquid mixture was then permitted to cool to room temperature whereupon a semi-solid gel formed. The gel was used to produce golden colored butter according to the procedure described in Example 1.

*Example 6*

235 g. of stearic acid were dissolved in 1970 g. of corn oil and to the solution were added 945 g. of a 24% suspension of carotene in oil according to the procedure described in Example 1. The warm mixture was canned and permitted to cool.

We claim:

1. A reversibly gelable coloring composition comprising about 1.0% to about 30% by weight of β-carotene suspended in an edible vegetable oil containing dissolved therein a minor proportion of an edible fatty acid having 16 to 22 carbon atoms.

2. A composition as in claim 1 wherein the fatty acid is stearic acid.

3. A reversibly gelable composition comprising about 1% to about 10% by weight of micropulverized β-carotene suspended in an edible vegetable oil which is liquid above about 10° C. and which contains dissolved therein about 2% to about 15% by weight of an edible aliphatic fatty acid having 16 to 22 carbon atoms.

4. A composition as in claim 3 wherein the fatty acid is stearic acid.

5. A composition as in claim 3 wherein the fatty acid is palmitic acid.

6. A composition as in claim 4 wherein the vegetable oil is corn oil.

7. A composition as in claim 5 wherein the vegetable oil is peanut oil.

8. A reversibly gelable composition comprising about 7% micropulverized β-carotene by weight suspended in corn oil containing dissolved therein about 7.5% by weight of stearic acid.

9. A reversible gel comprising β-carotene and a minor amount of a fatty acid having 16 to 22 carbon atoms in a major proportion of vegetable oil.

10. A reversible gel comprising about 1.0% to about 30% by weight of β-carotene in an edible vegetable oil containing dissolved therein a minor proportion of an edible fatty acid having 16 to 22 carbon atoms.

11. A reversible gel comprising about 1% to about 10% by weight of micropulverized β-carotene suspended in corn oil which contains dissolved therein about 5% to about 10% by weight of stearic acid.

12. A reversible gel comprising about 1% to about 10% by weight of micropulverized β-carotene suspended in peanut oil which contains dissolved therein about 5% to about 10% by weight of palmitic acid.

13. A method for producing a reversibly gelable coloring composition which comprises dissolving a minor proportion of a fatty acid containing 16 to 22 carbon atoms in an edible vegetable oil at an elevated temperature, and suspending about 1.0% to about 30% by weight of micropulverized β-carotene in the warm solution.

14. A method for producing a reversibly gelable coloring composition which comprises dissolving a minor proportion of a fatty acid containing 16 to 22 carbon atoms in an edible vegetable oil at an elevated temperature, suspending about 1.0% to about 30% by weight of micropulverized β-carotene in the warm solution and permitting the mixture to cool below about 30° C.

15. A method as in claim 13 wherein the vegetable oil is corn oil and the fatty acid is stearic acid.

16. A method which comprises dissolving about 2% to about 15% by weight of a fatty acid having 16 to 22 carbon atoms in an edible vegetable oil which is liquid above about 10° C. at a temperature in the range of about 65° to about 75° C., cooling the solution to a temperature in the range of about 45° to 50° C., suspending therein about 1% to about 10% by weight of β-carotene and permitting the suspension to cool to a temperature below about 30° C. at which a gel sets.

17. A method as in claim 16 wherein the vegetable oil is corn oil.

18. A method as in claim 16 wherein the vegetable oil is peanut oil.

19. A method as in claim 17 wherein the fatty acid is stearic acid.

20. A method as in claim 18 wherein the fatty acid is palmitic acid.

References Cited in the file of this patent

UNITED STATES PATENTS

| | | |
|---|---|---|
| 2,032,165 | Barnett et al. | Feb. 25, 1935 |
| 2,477,928 | Hartmann et al. | Aug. 2, 1949 |
| 2,656,274 | Tiedt et al. | Oct. 20, 1953 |
| 2,777,798 | Hochberg et al. | Jan. 15, 1957 |